UNITED STATES PATENT OFFICE.

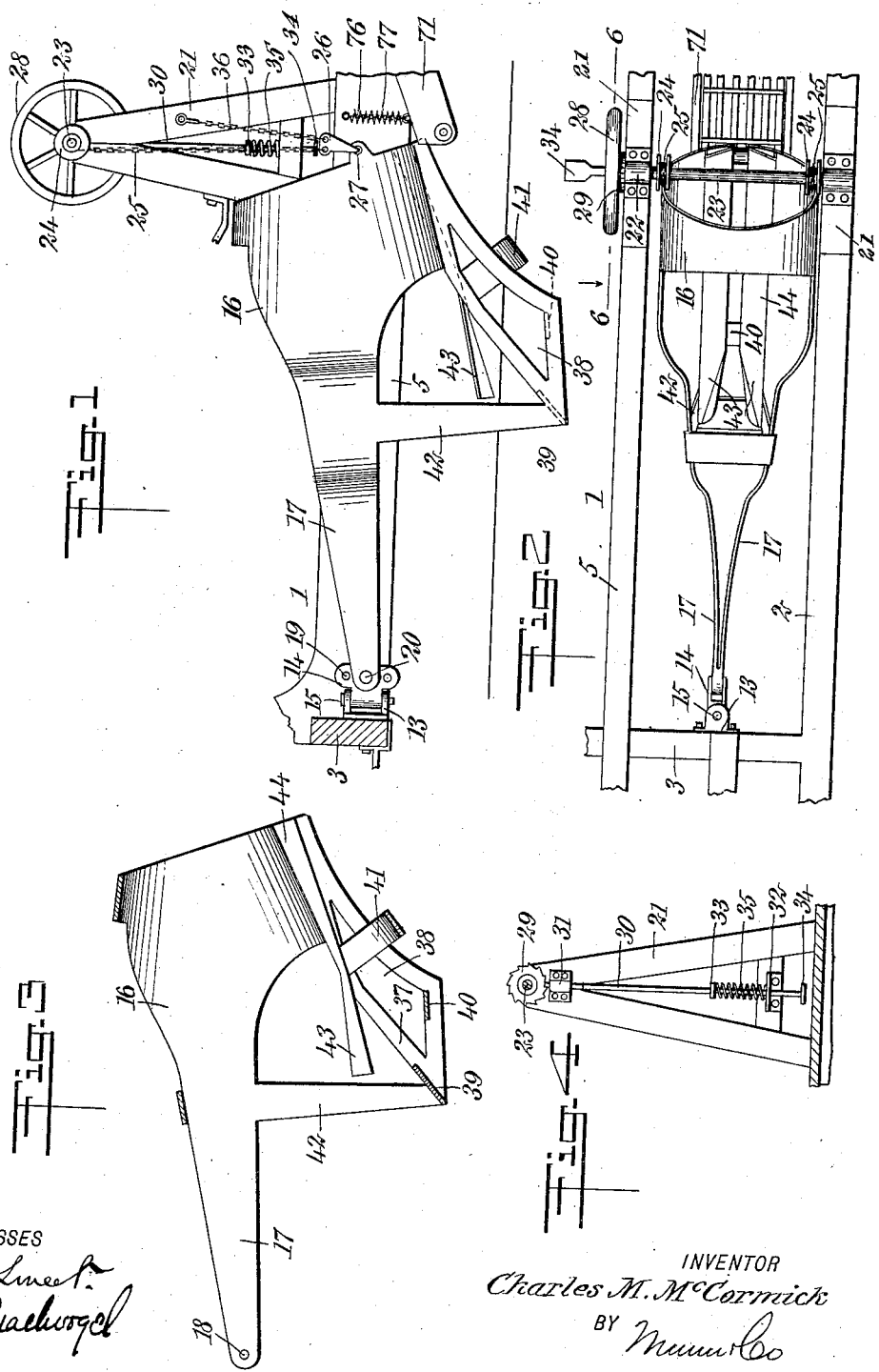

CHARLES M. McCORMICK, OF LA JUNTA, COLORADO.

BEET-HARVESTER.

No. 891,184.　　　Specification of Letters Patent.　　　Patented June 16, 1908.

Application filed April 23, 1907. Serial No. 369,845.

*To all whom it may concern:*

Be it known that I, CHARLES M. MCCORMICK, a citizen of the United States, and a resident of La Junta, in the county of Otero and State of Colorado, have invented a new and Improved Beet-Harvester, of which the following is a full, clear, and exact description.

This invention relates to beet harvesters, and is particularly useful with devices of this class which remove the tops from the roots, dig the latter from the ground, and convey the roots to a hopper whence they are removed to a wagon or the like.

The object of this invention is to provide a simple, strong and inexpensive beet harvester, which is provided with an efficient plow for digging the beet roots from the ground without injury thereto.

The invention consists in the construction and combination of parts to be more particularly described hereinafter and fully set forth in the claims.

Reference is to be had to the accompanying drawings in which

Figure 1 is a longitudinal section of the harvester showing the plow; Fig. 2 is a plan view of a portion of the harvester showing the plow; Fig. 3 is a longitudinal section of the plow; and Fig. 4 is a transverse section showing a detail of the plow-controlling mechanism.

Like characters of reference designate corresponding parts in all the views.

Referring more particularly to the parts, 1 represents the frame of the beet harvester of my invention, having the longitudinal supporting members 2 and 5 and the transverse supporting member 3. The frame is mounted upon suitable wheels permitting it to be propelled along the ground in the usual manner and has steering means and means for facilitating the attachment thereto of draft animals or the like. The forward transverse frame member 3 carries a bracket 13 upon which is pivotally mounted a wing member 14 by means of a pivot pin 15.

I provide a plow 16 formed of sheet metal or other suitable material and having the sides downwardly disposed. The body of the plow is curved and has extensions 17 disposed towards each other to form a pivot arm having an opening 18 therethrough near the extremity. The wing member 14 is provided with a plurality of openings 19 through the sides thereof. The arm 17 of the plow body 16 is arranged between the sides of the wing member, and is pivotally carried by the same by means of a pivot pin 20 which is located in the opening 18 of the arm 17 and registering openings 19 in the sides of the wing member. The arrangement is such that the plow is free to swing in a vertical direction about the pivot pin 20 and at the same time is free to swing laterally, as the wing member 14 is pivoted to the bracket 13. Uprights 21 are mounted upon the longitudinal frame members 2 and 5 adjacent to the plow body, and have bearings 22 at their upper extremities in which is mounted a shaft 23 having drums 24. Chains 25 are secured to the drums 24 and wound thereupon, the opposite ends of the chains being secured by means of a plate 26 to extensions 27 of the plow body. A hand-wheel 28 rigid with the shaft 23 serves for manually operating the same. A ratchet-wheel 29 is rigidly secured to the shaft 23 and engages with the end of a rod 30 slidably mounted in brackets 31 and 32 carried by an upright 21. The rod 30 has a rigid cross-head 33 and at the lower extremity a laterally-disposed pedal 34. Mounted upon the rod 30 between the bracket 32 and the cross-head 33 is a helical spring 35 normally forcing the end of the rod 30 into engagement with the ratchet 29, thereby preventing the rotation of the shaft 23 in one direction. The arrangement is such that the ratchet-wheel 29 and rod 30 prevent the rotation of the shaft 23, by means of the weight of the plow exerting a downward pull upon the chains 25. When it is desired to lower the plow body, the rod 30 is depressed by means of the pedal 34 whereby the ratchet 29 is released and the plow is lowered. Chains 36 are secured at one end to the upright 21 and at the opposite end to the plate 26 whereby the downward movement of the plow body is limited.

The sides 37 of the plow have the lower edges substantially horizontal and are cut away near the center to form openings 38. An inclined transverse plow blade 39 is carried by the sides 37 near the forward edge thereof. A second transverse blade 40 is carried by sides 37 at the rear of the transverse blade 39. A curved cross guide 41 is mounted between the upper parts of the plow sides and serves to direct the beets loosened by the blades 39 and 40. Supports 42 presenting edges to the front of the plow, extend from the plow body to the plow sides near the forward portions of the latter. Lateral blades 43 are carried by the plow sides above the transverse plow blades. The lateral blades converge rearwardly to form guide blades 44 which serve to direct the loosened roots through the plow to the rear thereof.

At the rear of the plow, the frame 1 carries a conveyer 71 for removing the roots from the plow and advancing them to a suitable receptacle. The conveyer has its forward end supported by means of chains 76 secured to the frame-work and it lies adjacent to the rear of the plow 16 properly to receive the roots excavated by the same. Helical springs 77 are arranged upon the supporting chains 76 and tend to raise the end of the conveyer 71 when the plow is raised, the end of the plow normally engaging the end of the frame to depress the latter. Thus, when the plow is raised above the ground, the frame is automatically raised at the same time through the action of the springs. The conveyer is actuated by suitable mechanism operated by the movement of the frame along the ground.

The operation of my beet harvester, which may be drawn by means of a traction engine or draft animals, is as follows: The plow, which is forced along under the earth behind the runner digs up the roots by means of the transverse blades, and as these are thrown up they pass along the guide blades and out at the rear of the plow, falling upon the conveyer arranged behind the plow.

Having thus described my invention, I claim as new and desire to secure by Letters Patent:

1. In a beet harvester, a plow having an inclined blade adapted to be forced horizontally under the ground, rearwardly converging blades thereabove, and a second inclined blade therebehind.

2. In a beet harvester, a plow having sides and an inclined blade between said sides and adapted to be forced horizontally under the ground, a second blade between said sides, and lateral rearwardly converging blades carried by said sides above said first blades.

3. In a beet harvester, a plow having sides, and an inclined blade between said sides and adapted to be forced horizontally under the ground, a second blade between said sides at an angle with said first inclined blade, lateral rearwardly inclined converging blades carried by said sides above said first blade, and guides on said sides at the rear of said converging blades.

4. In a beet harvester, a plow having a body presenting downwardly disposed sides, inclined transverse blades carried between said sides, lateral rearwardly converging blades on said sides above said transverse blades, and guides mounted upon said body and extending rearwardly from said converging blades.

5. In a beet harvester, a plow having a body presenting downwardly disposed sides, a transverse inclined blade carried by said sides at the forward edges thereof, a second transverse blade carried by said sides at the rear of said first transverse blade and at an angle therewith, lateral rearwardly converging blades on said sides above said transverse blades, said converging blades projecting beyond said sides at the forward edges of the same, guides carried by said sides at the rear of said converging blades, and a guide band between said sides at the rear of said transverse blades.

6. In a beet harvester, an adjustable plow having an inclined blade adapted to be forced horizontally under the ground, rearwardly converging blades thereabove, a second inclined blade therebehind, means for raising and lowering said plow, and means for limiting the downward movement of said plow.

7. In a beet harvester, a frame adapted to be moved over the ground, an adjustable plow having a pivot extension adapted to be pivoted to said frame at a plurality of points of said extension, said body of said plow having downwardly disposed sides, an inclined blade mounted between said sides and adapted to be forced horizontally under the ground, rearwardly converging blades carried by said sides above said inclined blade, a second inclined blade carried by said sides at the rear of said first inclined blade, a shaft mounted upon said frame and adapted to be manually operated, a chain wound upon said shaft and having an end secured to said body, means for holding said shaft in a plurality of positions, and means for limiting the movement of said shaft in one direction.

In testimony whereof I have signed my name to this specification in the presence of two subscribing witnesses.

CHAS. M. McCORMICK.

Witnesses:
R. B. CORBIN,
BLANCHE RECKORD.